United States Patent [19]
Nishino

[11] Patent Number: 5,724,141
[45] Date of Patent: Mar. 3, 1998

[54] DISTANCE MEASURING APPARATUS

[75] Inventor: Jun Nishino, Omiya, Japan

[73] Assignee: Kansei Corporation, Omiya, Japan

[21] Appl. No.: 683,885

[22] Filed: Jul. 19, 1996

[30] Foreign Application Priority Data

Jul. 19, 1995 [JP] Japan .................. 7-182948

[51] Int. Cl.$^6$ .................................. G01B 11/14
[52] U.S. Cl. .............. 356/375; 356/5.01; 340/903; 250/573
[58] Field of Search ................. 356/375, 376, 356/28, 3, 4.01, 4.07, 5.01, 5.08; 340/903, 904, 942, 992, 938, 939, 941, 583, 435, 469; 250/559.29, 559.38, 573

[56] References Cited

U.S. PATENT DOCUMENTS

| | | |
|---|---|---|
| 3,587,040 | 6/1971 | Fathauer . |
| 3,604,805 | 9/1971 | Scott . |
| 4,699,507 | 10/1987 | Etoh . |
| 4,760,272 | 7/1988 | Wang ........................ 250/573 |
| 4,880,307 | 11/1989 | Endo et al. ................... 356/375 |
| 5,283,622 | 2/1994 | Ueno et al. ................... 356/5.01 |

*Primary Examiner*—K. Hantis
*Attorney, Agent, or Firm*—Foley & Lardner

[57] ABSTRACT

A distance measuring apparatus has: light receiving means for receiving light which is emitted from a light emitting element unit and reflected from an obstacle having a reflecting surface, a pair of members of high reflection performance being respectively disposed on portions of the reflecting surface; and a calculating circuit for calculating a distance from the obstacle on the basis of a time period between the emission and the reception of the light. According to the apparatus, in a measurement range of a short distance where light reflected from a reflecting surface positioned between the pair of members of high reflection performance is received, the maximum amount of light received by the light receiving means is set to be smaller than a sensitivity at which a snowfall is detected, and the minimum amount of light is reduced to a level at which an obstacle positioned at the short distance can be detected.

8 Claims, 6 Drawing Sheets

DISTANCE MEASURING APPARATUS

BACKGROUND OF THE INVENTION

1. Field of the Invention

The invention relates to a distance measuring apparatus which receives light emitted by a light emitting element unit and reflected by an obstacle and calculates the distance from the obstacle on the basis of the time period between the emission and the reception of the light.

2. Description of the Related Art

In a prior art distance measuring apparatus of such a kind, light emitted from a light emitting element unit is reflected by reflectors (reflecting members) which are disposed in a rear portion of a preceding vehicle (obstacle), the reflected light is received by the apparatus, and the distance from the preceding vehicle is calculated.

Figure 3:
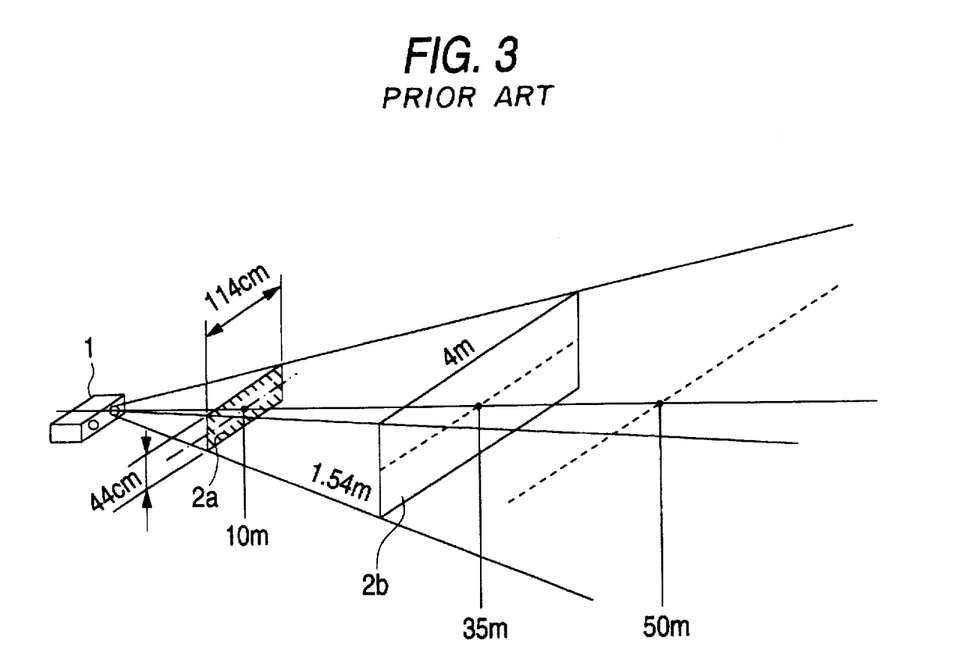
FIG. 3 is a diagram showing an irradiation area with respect to a distance.

FIG. 3 is a view quantitatively showing the detection area in a case of using specific reflectors as objects. The reference numeral 1 designates a distance measuring apparatus, and 2a and 2b designate detection areas which are changed in accordance with the distance.

Figure 4:
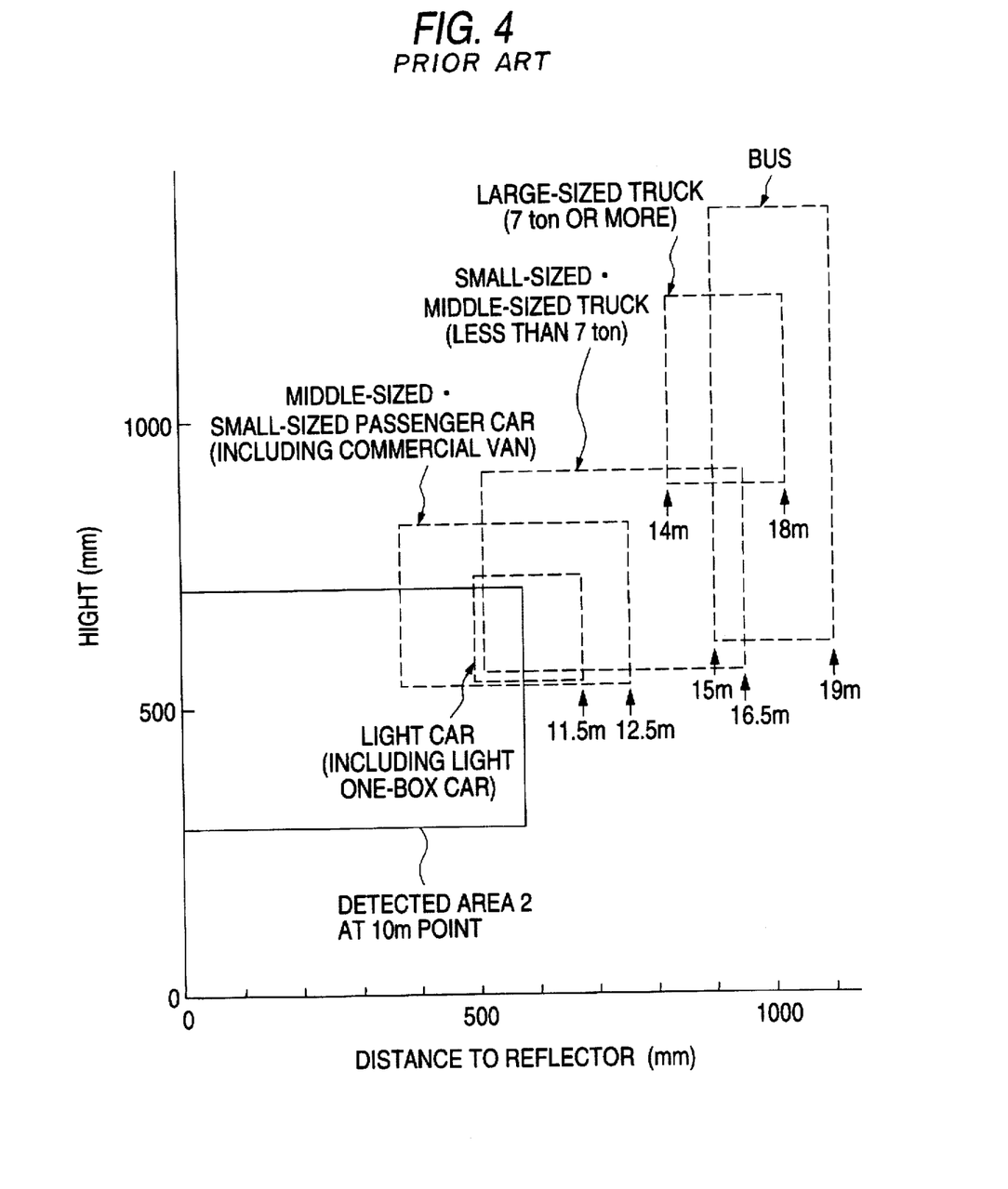
FIG. 4 is a diagram showing positions of attaching reflectors for various kinds of vehicles, with respect to a detection area at a 10-m position.

On the other hand, as shown in FIG. 4, the range in an actual vehicle where reflectors 3 can be attached is variously distributed depending on the kind of the vehicle. At a short distance of about 10 m or less, the attachment range cannot be within the irradiation area, i.e., a detection area 2 (2a, 2b) in most cases. FIG. 4 is a view in which the abscissa is the distance from the center of the vehicle body and the ordinate is the positions of the preceding vehicle where reflectors are attached. In the figure, "11.5 m" indicates the shortest distance which is required for detecting reflectors on a light car, and "19 m" indicates the shortest distance which is required for detecting reflectors on a bus. Also the other values indicate positions of various kinds of preceding vehicles where reflectors are attached.

Figure 5:
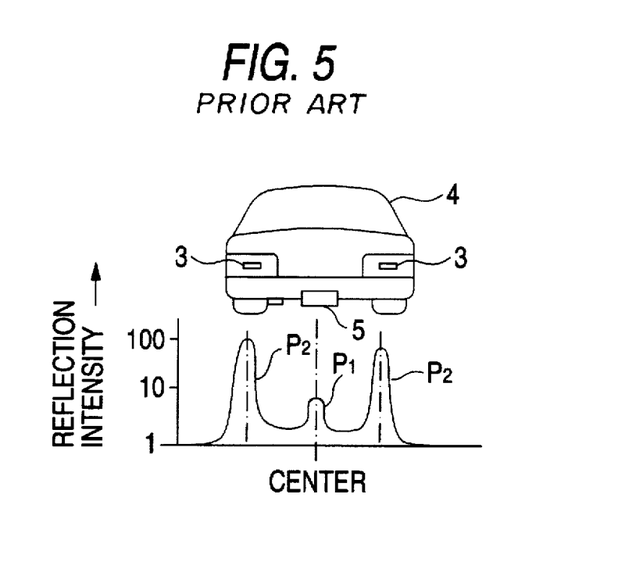
FIG. 5 is a diagram showing the intensity of reflection from a rear portion of the vehicle body.
Figure 6:
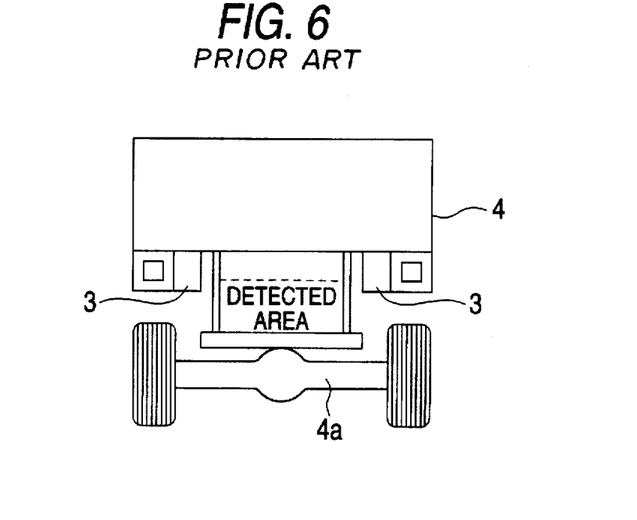
FIG. 6 is a view showing a rear portion of the vehicle body of a truck.

As seen from the figure, at a short distance, the reflectors 3 of a preceding vehicle are not within the detection area 2. Consequently, only reflection from the structure or target of the lower portion of the vehicle body 4 is expected. However, the amount of such reflection is very small. Even in a passenger car from which a relatively large amount of reflection is obtained, as shown in FIG. 5, the intensity P1 of reflection from the structure or target of the lower portion of the vehicle body 4 (a license plate 5 in the illustrated example) is not greater than about 1/100 of the intensity P2 of reflection from the reflectors 3. In the case of a truck, as shown in FIG. 6, the vehicle body 4 is so high that only reflection from a small area such as an axle 4a is obtained, with the result that the intensity of reflection is further lowered.

To comply with this, it may be contemplated that the sensitivity of light receiving means is enhanced so that the distance measurement is enabled also on the basis of light reflected from the lower portion of the vehicle body 4 from which low intensity of reflection is obtained. When the sensitivity of light reception is enhanced, however, there may occur a case where, when snow falls, the light receiving means receives light reflected from snow and erroneously operates.

As a countermeasure for overcoming this disadvantage, the following configuration may be employed. The configuration will be described with reference to FIG. 7.

Figure 7:
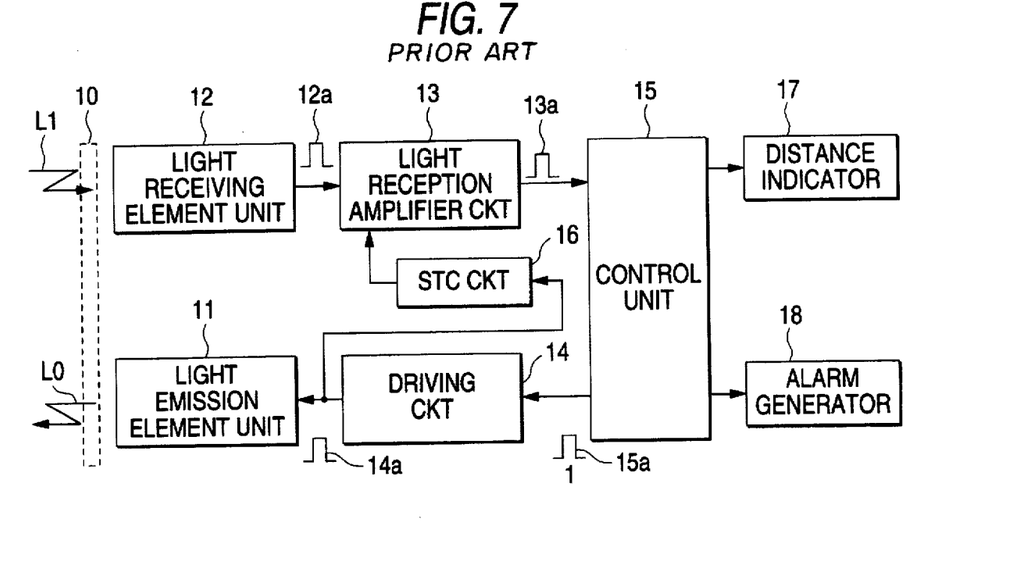
FIG. 7 is a block diagram showing a distance measuring apparatus of the prior art.

FIG. 7 is a block diagram showing the configuration of a distance measuring apparatus. In FIG. 7, 11 designates a light emitting element unit having a device such as a laser diode which emits light L0 toward a forward obstacle via a transparent glass plate 10, 12 designates a light receiving element unit having a device such as a photodiode which receives light L1 reflected from the forward obstacle such as a preceding vehicle via the transparent glass plate 10, and outputs a light reception signal 12a, 13 designates a light reception amplifier which outputs a light reception signal 13a obtained by amplifying the light reception signal 12a from the light receiving element unit 12 on the basis of a signal from an STC circuit 16 described later, 14 designates a driving circuit which, in response to an activation signal 15a from a control circuit 15 described later, outputs a driving signal 14a to conduct a pulse-driving operation on the light emitting element unit 11, and 15 designates the control circuit configured by a computer and the like which supplies the activation signal 15a to the driving circuit 14, measures the time period from the output of the activation signal 15a to the reception of the light reception signal 13a from the light reception amplifier circuit 13, and calculates the distance based on the measurement result or the time period. The control circuit is subjected to a program-driving operation. The reference numeral 16 designates sensitivity reducing means (hereinafter, referred to as "STC circuit") which is activated in response to the driving signal 14a from the driving circuit 14, and reduces the sensitivity of the light reception amplifier circuit 13 along, for example, a curve of the ½ power (this curve is produced by a time-constant circuit configured by a resistor and a capacitor), in a measurement range of a short distance where light emitted from the light emitting device and reflected by the obstacle is received within a short time period. The reference numeral 17 designates a distance indicator which displays the distance calculated by the control circuit 15, and 18 designates an alarm generator which, when it is judged from the distance calculation result in the control circuit 15 that a dangerous state arises, informs of it. In FIG. 7, a filter circuit 19 (see FIG. 8) is connected between the light receiving element unit 12 and the light reception amplifier circuit 13.

Figure 8:
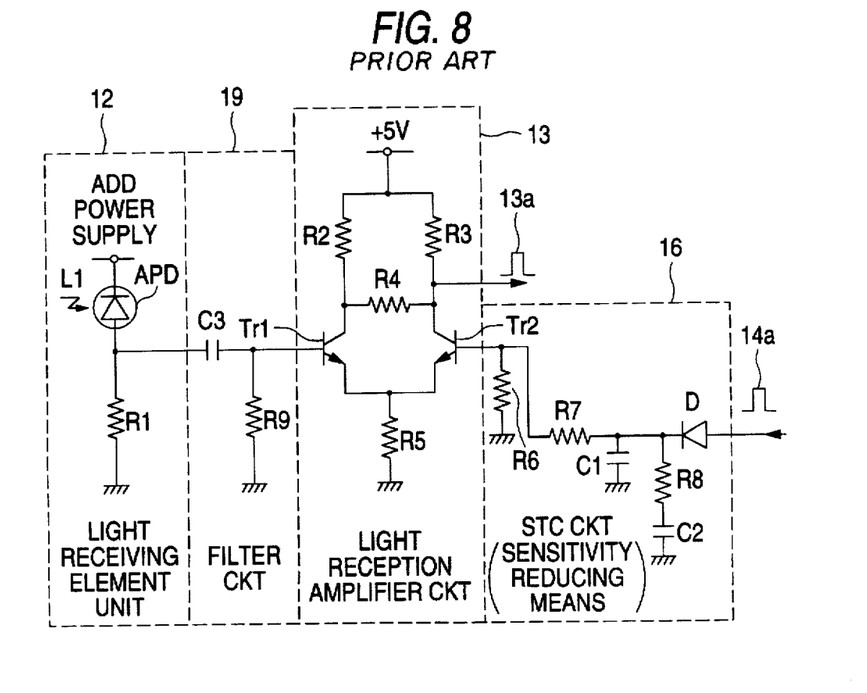
FIG. 8 is a circuit diagram specifically showing a part of the block diagram of FIG. 7.

FIG. 8 shows a specific example of the circuit of the light receiving element unit 12, the light reception amplifier circuit 13, the STC circuit 16, and the filter circuit 19. The light receiving element unit 12 is configured by an avalanche photodiode (hereinafter, abbreviated as "APD") and a resistor R1. The light reception amplifier circuit 13 is configured by a differential amplifier consisting of a pair of transistors Tr1 and Tr2 and a plurality of resistors R2 to R5. The STC circuit 16 is configured by a diode D, resistors R6 to R8, capacitors C1 and C2, etc. In accordance with the driving signal 14a from the driving circuit 14, the input to the base of the transistor Tr2 is changed in such a manner that, in a measurement range of a short distance where light emitted from the light emitting device 11 and reflected by the forward obstacle is received within a short time period, the sensitivity of the light reception amplifier circuit 13 is lowered on the basis of the time constant which is determined by the resistors R6 to R8 and the capacitors C1 and C2. The reference numeral 19 designates the filter circuit that is connected between the light receiving element unit 12 and the light reception amplifier circuit 13 and that has a bypass function. The filter circuit 19 is configured by a capacitor C3 and a resistor R9.

Figure 9:
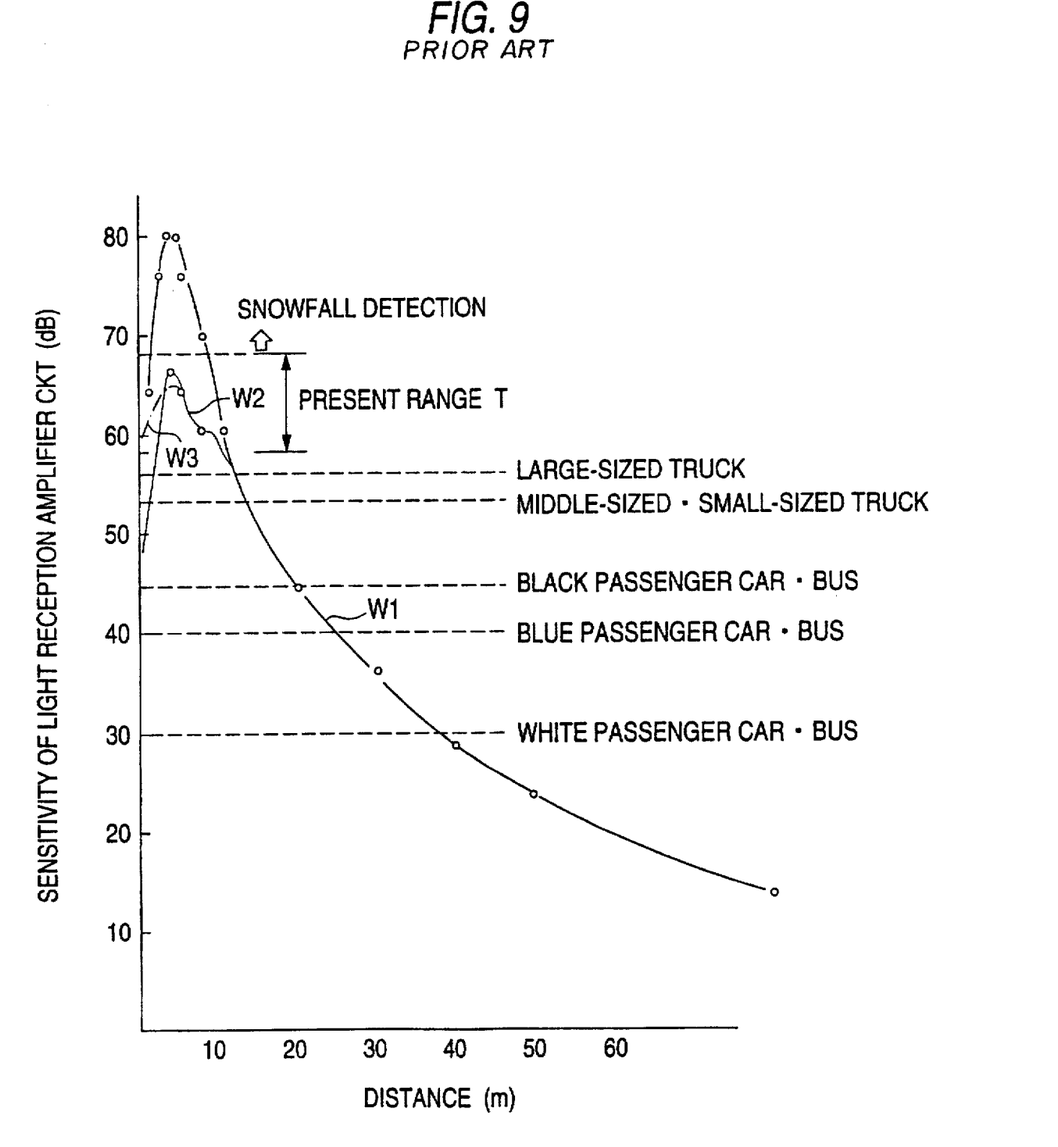
FIG. 9 is a graph showing the sensitivity characteristic of a light reception amplifier.

FIG. 9 is a graph showing the sensitivity characteristic of the light reception amplifier circuit 13. The abscissa is a distance between the vehicle on which the apparatus is mounted (hereinafter, such a vehicle is referred to as "present vehicle") and reflectors disposed in a rear portion of a preceding vehicle which is a forward obstacle, and the ordinate is the sensitivity of the light reception amplifier circuit 13. In FIG. 9, W indicates sensitivity curves. As seen from the sensitivity curves W, the sensitivity is made higher as moving toward the area such as a short distance area where reflection from the reflectors of the preceding vehicle cannot be expected. In other words, as the distance is increased, the irradiation area is widened as shown in FIG. 3 so that the apparatus receives light reflected from the reflectors 3 and of high intensity. Even when the sensitivity of the light reception amplifier circuit 13 is lowered, therefore, there arises no problem.

On the other hand, when the sensitivity of the light reception amplifier circuit 13 at a short distance of about 10 m or less is enhanced, there may occur a case where, when snow falls, the light reception amplifier erroneously operates in response to light reflected from snow. To comply with this, in the measurement range of a short distance, the sensitivity curve W1 is lowered as the sensitivity curve W2, and the output of the STC circuit 16 is previously set so that the sensitivity is maintained to be in a preset range T in which a large truck can be detected but a snowfall cannot be detected.

Next, the operation of the above-described configuration will be described. First, the driving circuit 14 is activated by the activation signal 15a which is periodically output from the control circuit 15. The light emitting element unit 11 is driven in response to the driving signal 14a from the driving circuit 14 so that light L0 is pulsatively generated. The light is reflected by the body, particularly the reflectors 3 of the preceding vehicle, and the reflected light L1 is incident on the light receiving element unit 12. The light receiving element unit 12 supplies the light reception signal 12a corresponding to the amount of the incident light, to the light reception amplifier circuit 13 which in turn amplifies the input light reception signal 12a and supplies the light reception signal 13a to the control circuit 15.

The control circuit 15 calculates the distance from the preceding vehicle on the basis of the time period from the timing of outputting the activation signal 15a to that when the circuit receives the supply of the light reception signal 13a from the light reception amplifier circuit 13. The calculated distance is output to the distance indicator 17 so as to be displayed thereon. When it is judged from the calculated distance that the present vehicle is too close to the preceding vehicle, the alarm generator 18 is activated so as to announce the danger.

In this case, as shown by the sensitivity curve W1 of FIG. 9, the sensitivity of the light reception amplifier circuit 13 is enhanced to a higher level as the measurement range is further moved from the long distance to a short distance of about 10 m or less. Even when the preceding vehicle is a truck, therefore, it is possible to surely detect the preceding vehicle on the basis of a very small amount of light reflected from a part of the vehicle body. In the measurement range of a short distance of about 10 m or less, the sensitivity of the light reception amplifier circuit 13 is lowered in accordance with the output signal 16a of the STC circuit 16 to a range where snowfall cannot be detected, as shown by the sensitivity curve W2. Therefore, there is no fear that the apparatus erroneously operates in response to light reflected from snow.

In the distance measuring apparatus described above, however, the STC circuit has a simple RC integrating circuit, or the time-constant circuit is configured by the capacitor and the resistor. Therefore, the characteristics of the STC circuit are limited to simple ones. This causes the amplification factor of the light reception amplifier to be lowered also at a very short distance of 5 m or less in the same manner as in the case of a range of a short distance of 5 to 10 m, thereby producing a problem in that the apparatus cannot detect a preceding vehicle or the like at a short distance of 5 m or less.

SUMMARY OF THE INVENTION

The invention has been conducted in view of the above problems with the prior art, and therefore an object of the invention is to provide an apparatus which can accurately detect an obstacle even at a short distance of, for example, 5 m or less in the same manner as a longer distance of 5 m or more.

According to a first aspect of the invention, there is provided a distance measuring apparatus, which comprises: light receiving means for receiving light which is emitted from a light emitting element unit and reflected from an obstacle having a reflecting surface, a pair of members of high reflection performance being respectively disposed on portions of the reflecting surface; and calculating means for calculating a distance from the obstacle on the basis of a time period between the emission of light from the light emitting element unit and the reception of the light, and, in a measurement range of a short distance where light reflected from a reflecting surface positioned between the pair of members of high reflection performance is received, a maximum amount of light received by the light receiving means is set to be smaller than a sensitivity at which a snowfall is detected, and a minimum amount of light is reduced to a level at which an obstacle positioned at the short distance can be detected.

According to a second aspect of the invention, there is provided a distance measuring apparatus, in the measurement range of a short distance where light reflected from a reflecting surface positioned between the members of high reflection performance is received, an amount of light emitted from the light emitting element unit is controlled so as to be quadratically changed in accordance with the calculated distance.

According to the first aspect of the invention, in a measurement range of a short distance where light reflected from a member other than the members of high reflection performance is received, the maximum amount of light received by the light receiving means is set to be smaller than a sensitivity at which snowfall is detected, and the minimum amount of light is set to a level at which a forward obstacle can be detected. Therefore, the apparatus can surely conduct the distance measurement even at a short distance.

According to the second aspect of the invention, in a measurement range of a short distance, the intensity of light emitted from the light emitting device is quadratically changed in a small degree so as to be limited. Therefore, the driving current of the light emitting device can be reduced to a low level so that the life period is prolonged.

BRIEF DESCRIPTION OF THE DRAWINGS

The above and other objects and features of the present invention will be more apparent from the following description taken in conjunction with the accompanying drawings.

DETAILED DESCRIPTION OF THE DETAILED DESCRIPTION

Now, a description will be given in more detail of an embodiment of the present invention with reference to the accompanying drawings.

Figure 1:
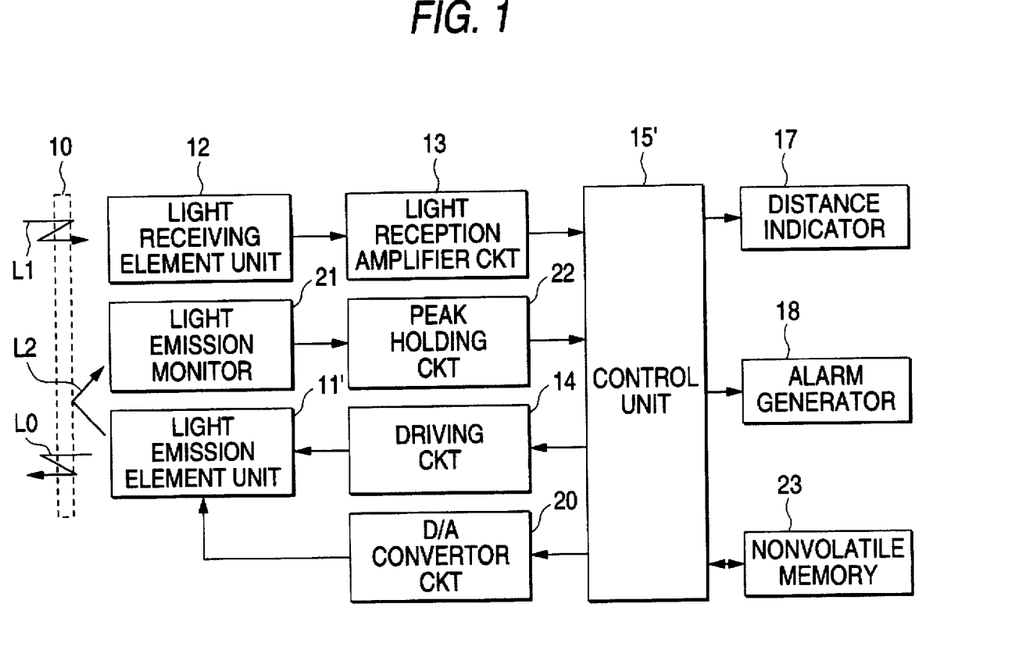
FIG. 1 is a circuit block diagram showing a distance measuring apparatus according to an embodiment of the invention.

FIG. 1 shows the configuration of an embodiment of the invention. In FIG. 1, components identical with or equivalent to those described in the prior art example of FIG. 7 are designated by the same reference numerals and their description is omitted.

The reference numeral 11' designates a light emitting element unit which is driven by the driving signal 14a from the driving circuit 14. The driving voltage is controlled by a control voltage signal from a D/A (Digital/Analog) converter circuit 20. The reference numeral 15' designates a control circuit which is obtained by adding the function described below to the control circuit 15 shown in FIG. 5. The function will be described in the following description of the other configuration.

Figure 2:
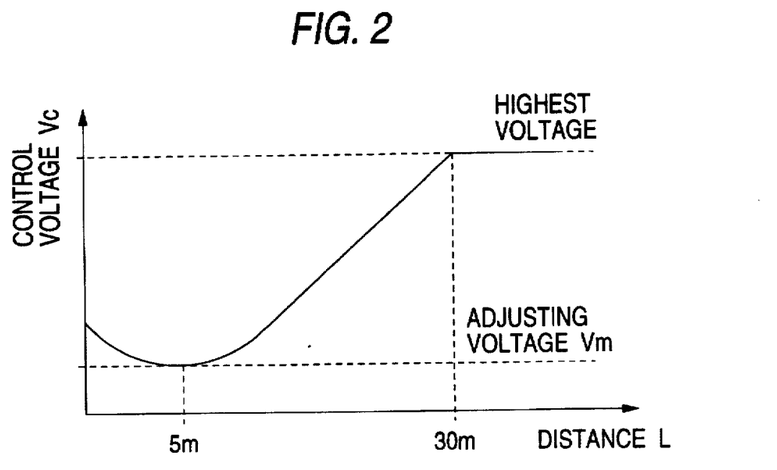
FIG. 2 is a characteristic graph showing the control state of a driving current of a light emitting element unit shown in FIG. 1, with respect to a calculated distance.

The reference numeral 23 designates a nonvolatile memory in which, in a range where the distance L is shorter than 30 m, the function such as shown in FIG. 2:

$$Vc = k \cdot L^2 + Vm \text{ (where } Vm \text{ is an adjusting voltage)}$$

is stored in the form of a data table, and, in a range where the distance L is not shorter than 30 m, the control voltage is set to be the highest voltage. When the signal indicative of the latest calculated distance L is supplied from the control circuit 15', the control voltage signal Vc corresponding to the distance is produced and the power source voltage Vc of the light emitting element unit 11' is controlled via the D/A converter circuit 20 so that the intensity of the emitted light is quadratically changed. The reference numeral 21 designates a light emission monitor which receives light L2 irregularly reflected by adherents such as dusts on the transparent glass plate 10, and 22 designates a peak holding circuit which detects the peak value of a light reception signal supplied from the light emission monitor 21 and supplies the peak value to the control circuit 15'. When the peak value exceeds a predetermined value, the control circuit 15' controls the alarm generator 18 so as to generate an alarm.

As described above, the invention can attain an effect that the measurement of a short distance can be accurately conducted. The invention can attain an effect that the driving current of the light emitting device can be reduced so that the life period of the light emitting device is prolonged.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A distance measuring apparatus for measuring a distance to an object, the object having a reflecting surface and a pair of members of at least a predetermined reflection performance respectively disposed on portions of said reflecting surface, said distance measuring apparatus comprising:

light emitting means for emitting light;

light receiving means for receiving light which is emitted from said light emitting means and which is reflected from the object;

calculating means for calculating a distance from the object on the basis of a period of time between the emission of light from said light emitting means and the reception of the light by said light receiving means; and means for controlling an amount of light emitted from said light emitting means so as to be quadratically changed in accordance with the calculated distance being in a measurement range of less than a first distance, wherein, in the measurement range of less than the first distance where light reflected from said reflecting surface positioned between said pair of members is received, a maximum amount of light capable of being received by said light receiving means is set to be smaller than a sensitivity at which a snowfall is detected, and a minimum amount of light capable of being received by said light receiving means is reduced to a level at which an object positioned at less than the first distance is detected, and wherein an output level of the light output by said light emitting means is set to a minimum amount when the calculated distance is about 5 meters.

2. A distance measuring apparatus according to claim 1, wherein the output level of the light output by said light emitting means decreases in a quadratic manner from a first amount to the minimum amount as the calculated distance increases within a first range from between 0 meters and 5 meters, and wherein the output level of the light output from said light emitting means increases in the quadratic manner from the minimum amount to a maximum amount as the calculated distance increases within a second range from between 5 meters and 30 meters.

3. A distance measuring apparatus according to claim 2, wherein the controlling means is capable of being set such that the minimum amount is adjustable to suit a particular environmental condition.

4. A distance measuring apparatus according to claim 1, further comprising:

a transparent plate disposed between the light emitting means and the object, the transparent plate having a first and a second surface being in a substantially parallel relationship to each other, the first surface being disposed closer to the light emitting means than the second surface;

light emission monitoring means for detecting light reflected off of the first surface of the transparent plate so as to determine an amount of interfering substances disposed on the transparent plate, the light emitting monitoring means outputting a signal periodically at first time periods in accordance with an amount of the detected light by the light emission monitoring means;

a peak holding circuit connected to receive the signal outputted by the light emission monitoring means and configured to detect a peak value of the signal within a predetermined period of time, the predetermined period of time being longer than one of the first time periods; and alarm indicating means for outputting an alarm signal when the peak value is determined to be greater than a predetermined amount, wherein the outputting of the alarm signal corresponds to an indication of a need for a cleaning of the transparent plate to ensure proper operation of the distance measuring apparatus.

5. A distance measuring apparatus according to claim 2, further comprising:

a transparent plate disposed between the light emitting unit and the object, the transparent plate having a first and a second surface being in a substantially parallel relationship to each other, the first surface being disposed closer to the light emitting unit than the second surface;

a light emission monitoring unit configured to detect light reflected off of the first surface of the transparent plate so as to determine an amount of interfering substances disposed on the transparent plate, the light emitting monitoring circuit configured to output a signal periodically at first time periods in accordance with an amount of the detected light by the light emission monitoring unit;

a peak holding circuit connected to receive the signal outputted by the light emission monitoring unit and configured to detect a peak value of the signal within a predetermined period of time, the predetermined period of time being longer than one of the first time periods; and an alarm indicating unit for outputting an alarm signal when the peak value is determined to be greater than a predetermined amount, wherein the outputting of the alarm signal corresponds to an indication of a need for a cleaning of the transparent plate to ensure proper operation of the distance measuring apparatus.

6. A distance measuring apparatus for measuring a distance to an object having a reflecting surface, said distance measuring apparatus comprising:

a light emitting unit configured to emit light at a first time based on a first signal received by said light emitting unit;

a light receiving unit configured to receive light which is emitted from said light emitting unit and which is reflected from the object, said light receiving unit outputting a second signal indicative of a second time at which the light was received by said light receiving unit;

a controlling and calculating circuit coupled to said light emitting unit and said light receiving unit and configured to calculate a distance from the object on the basis of a period of time between said first time in which said light emitting unit emitted the light toward the object and said second time in which said light receiving unit received the light which was emitted from said light emitting unit and which was reflected from the object, said controlling and calculating circuit configured to control output of the first signal to said light emitting unit and to receive the second signal outputted from said light receiving unit, wherein said controlling and calculating circuit controls an amount of light emitted from said light emitting unit such that the light emitted from said light emitting unit is quadratically changed in accordance with the calculated distance being in the measurement range of less than a first distance, and wherein the amount of light emitted from said light emitting unit is set to a minimum amount when the calculated distance is about 5 meters.

7. A distance measuring apparatus according to claim 6, wherein the amount of light output by said light emitting unit decreases in a quadratic manner in a first range from a first amount to the minimum amount as the calculated distance increases within a second range from between 0 meters and 5 meters, and wherein the amount of light output from said light emitting unit increases in the quadratic manner in a third range from the minimum amount to a maximum amount as the calculated distance increases within a fourth range from between 5 meters and 30 meters.

8. A distance measuring apparatus according to claim 7, wherein the controlling and calculating circuit is capable of being set such that the minimum amount is adjustable to suit a particular environmental condition.

* * * * *